United States Patent
Yoshimoto

(10) Patent No.: US 7,613,081 B2
(45) Date of Patent: Nov. 3, 2009

(54) CONTROL OF STEPPER MOTOR IN AN OPTICAL DISC

(75) Inventor: Ainobu Yoshimoto, Milpitas, CA (US)

(73) Assignee: LSI Corporation, Milpitas, CA (US)

( * ) Notice: Subject to any disclaimer, the term of this patent is extended or adjusted under 35 U.S.C. 154(b) by 630 days.

(21) Appl. No.: 11/095,974

(22) Filed: Mar. 31, 2005

(65) Prior Publication Data

US 2006/0221789 A1    Oct. 5, 2006

(51) Int. Cl.
G11B 7/00 (2006.01)
(52) U.S. Cl. .............. 369/44.25; 369/44.28; 369/44.34; 369/53.28
(58) Field of Classification Search .............. 369/30.27, 369/43, 53.23, 53.34, 53.28
See application file for complete search history.

(56) References Cited

U.S. PATENT DOCUMENTS

| | | | | |
|---|---|---|---|---|
| 5,251,194 A * | 10/1993 | Yoshimoto et al. | ....... | 369/44.26 |
| 5,347,503 A * | 9/1994 | Koyama et al. | .......... | 369/44.32 |
| 6,552,973 B1 * | 4/2003 | Kang et al. | .............. | 369/44.32 |
| 6,693,861 B1 * | 2/2004 | Lim | .......................... | 369/44.28 |
| 7,016,272 B2 * | 3/2006 | Enokihara | ................. | 369/44.29 |
| 2002/0136112 A1 * | 9/2002 | Kadlec et al. | ............ | 369/44.29 |
| 2002/0136123 A1 * | 9/2002 | Ogawa | ..................... | 369/47.53 |
| 2003/0231564 A1 * | 12/2003 | Ukawa | ..................... | 369/44.29 |
| 2004/0136282 A1 * | 7/2004 | Chen | ........................ | 369/44.35 |
| 2005/0036409 A1 * | 2/2005 | Hong et al. | .............. | 369/44.32 |
| 2005/0141362 A1 * | 6/2005 | Lin et al. | .................. | 369/44.28 |
| 2006/0072417 A1 * | 4/2006 | Tseng et al. | ............. | 369/53.28 |

* cited by examiner

Primary Examiner—Hoa T Nguyen
Assistant Examiner—Mark Fischer
(74) Attorney, Agent, or Firm—Christopher P. Maiorana, PC

(57) ABSTRACT

A method for controlling a stepper motor in an optical disc system, comprising the steps of (A) measuring a static offset of a center error signal, (B) measuring a maximum value, minimum value and an average value of the center error signal in response to rotating the optical disc, (C) computing one or more upper threshold values and one or more lower threshold values of the center error signal, (D) sampling the center error signal, (E) comparing the center error signal to the one or more upper threshold values and to the one or more lower threshold values and (F) computing a control output to control the stepper motor in response to comparing the center error signal to the one or more upper and lower threshold values.

17 Claims, 7 Drawing Sheets

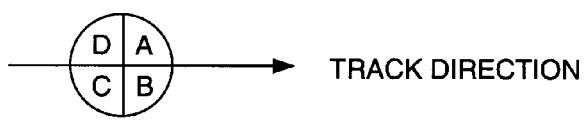
TRACK DIRECTION
FIG. 1
(CONVENTIONAL)
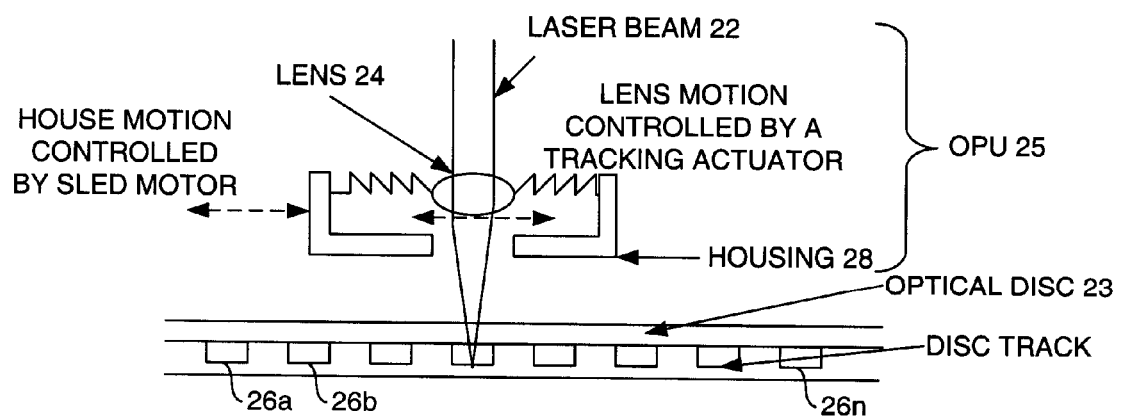
FIG. 2
(CONVENTIONAL)

CONTROL OF STEPPER MOTOR IN AN OPTICAL DISC

FIELD OF THE INVENTION

The present invention relates to optical storage generally and, more particularly, to a method and/or apparatus for stepper motion control in an optical disc system.

BACKGROUND OF THE INVENTION

In a conventional optical disc system, to sense the position of the laser beam in relation to the track on the disc, the main laser beam creates a reflection from the disc. The reflection is typically picked up by 4 photo-diode sensors. FIG. 1 is a conceptual diagram illustrating how such a photo-diode configuration is laid out in relation to the track direction. The outputs of the 4 photo-diodes (when the laser beam is focused on the disc) are shown as signals A, B, C and D, respectively.

To control the position of a main laser beam 22 on the optical disc 23, the position of the objective lens 24 of the Optical Pickup Unit (OPU) 25 related to the tracks 26a-26n on the optical disc 23 is controlled by a tracking actuator. The OPU 25 is a device configured to emit a laser beam 22 and pick up the optical reflection of the beam 22. The OPU 25 converts such reflections to electrical signals. The position of the lens 24 and a housing 28 of the, OPU 25 are controlled by a stepper motor (not shown). The stepper motor moves the whole OPU 25. FIG. 2 illustrates the motion of the OPU 25 and the lens 24.

To direct the laser beam 22 to a particular one of the tracks 26a-26n of the optical disc 23, or to cross the tracks 26a-26n of the optical disc 23, the tracking actuator and the stepper motor are controlled at the same time. The tracking actuator controls the position of the lens 24 in relation to the optical disc 23. The stepper motor controls the position of the lens 24 in relation to the lens housing 28.

Control of the stepper motor is based on the same method used in controlling a DC motor. A conventional approach to control the stepper motor uses the bias force of the tracking actuator to sense the position of the lens 24 in the housing 28. Such a conventional approach will direct the motion of the stepper motor appropriately when the tracking actuator controls the laser beam 22. The tracking actuator will direct the motion of the laser beam 22 when the laser beam 22 stays on a particular one of the tracks 26a-26n, or when the laser beam 22 moves across the tracks 26a-26n.

When the laser beam 22 stays on a particular one of the tracks 26a-26n, the laser beam 22 should be balanced. The balancing is accomplished by positioning the center of the laser beam 22 on the center of a particular one of the tracks 26a-26n. Positioning the center of the laser beam 22 on the center of the particular one of the tracks 26a-26n improves the quality of the signal picked up from the optical disc 23 to perform either reading or recording on the optical disc 23. With conventional approaches, the bias force of the tracking actuator cannot handle the balance of the laser beam 22 when the laser beam 20 is positioned on the particular one of the tracks 26a-26n.

It would be desirable to provide a method and/or apparatus to improve the balance of a laser beam when the laser beam is positioned on the particular track through control of the stepper motor.

SUMMARY OF THE INVENTION

The present invention concerns a method for controlling a stepper motor in an optical disc system, comprising the steps of (A) measuring a static offset of a center error signal, (B) measuring a maximum value, minimum value and an average value of the center error signal in response to rotating the optical disc, (C) computing one or more upper threshold values and one or more lower threshold values of the center error signal, (D) sampling the center error signal, (E) comparing the center error signal to the one or more upper threshold values and to the one or more lower threshold values and (F) computing a control output to control the stepper motor in response to comparing the center error signal to the one or more upper and lower threshold values.

The objects, features and advantages of the present invention include providing method and/or apparatus for controlling a stepper motor in an optical disc system that may (i) provide improved balance of a laser beam, (ii) provide an ultimate solution, (iii) be simple to implement, (iv) not need additional hardware, (v) implemented in firmware or hardware, (vi) be sensitive and reliable, and/or (vii) provide a low cost solution.

BRIEF DESCRIPTION OF THE DRAWINGS

These and other objects, features and advantages of the present invention will be apparent from the following detailed description and the appended claims and drawings in which:

FIG. 1 illustrates a photo-diode sensor distribution system;

FIG. 2 illustrates a lens and a lens housing in relation to a position of a laser beam;

DETAILED DESCRIPTION OF THE PREFERRED EMBODIMENTS

Figure 3:
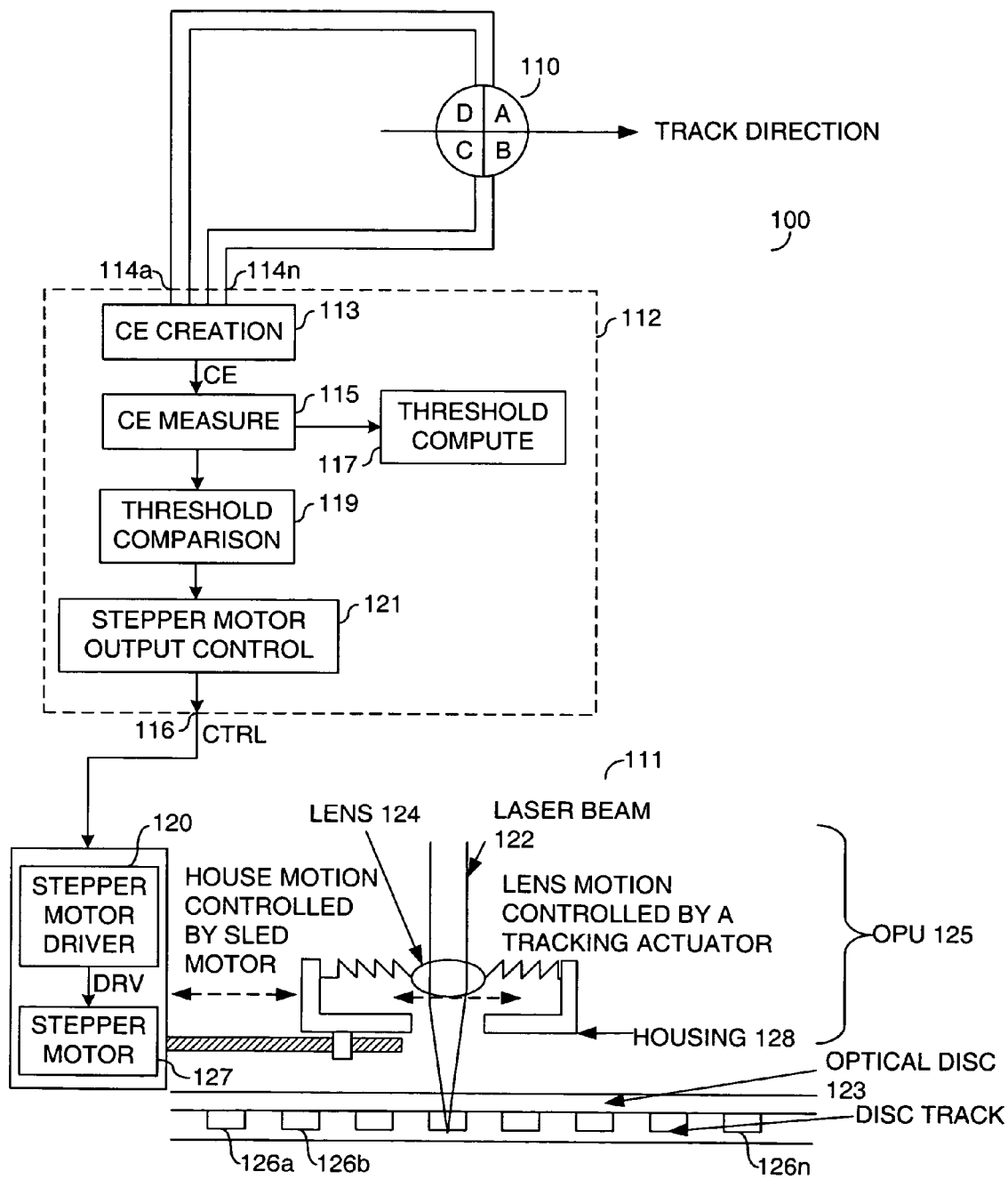
FIG. 3 is a diagram of a system illustrating the present invention.

Referring to FIG. 3, a diagram of a system 100 illustrating the present invention is shown. The system 100 generally comprises a photo-diode distribution portion 110 and a lens housing portion 111. The photo-diode system 110 generally has output signals (or photo-diode signals) A, B, C and D that are generally presented to a number of inputs 114a-114n of a control circuit 112. The control circuit generally comprises a creation block (or circuit) 113, a measure block (or circuit) 115, a threshold compute block (or circuit) 117, a comparison block (or circuit) 119 and a stepper motor output control block (or circuit) 121. The creation block 113 may be implemented as a center error (CE) creation block. The measure block 115 may be implemented as a center error (CE) measure block. The output of the center error (CE) creation block 113 may present a signal (e.g., CE) The signal CE is passed to the CE measure block 115 to measure a static offset level, a maximum value, a minimum value and an average value of the signal CE. The static offset level of CE is the value of CE when the laser beam is turned off. The signal CE may be passed through the threshold compute block 117. The threshold compute block 117 generates one or more upper threshold values and one or more lower threshold values in response to the static offset level, the maximum value, the minimum value and the average value of the signal CE.

The comparison block 119 compares the signal CE to the upper threshold values and the lower threshold values. Based on the comparison result, the output control compute block 121 will create the output to control the stepper motor 127. The control block 112 has an output 116 that presents a control signal (e.g., CTRL) that controls a stepper motor driver 120. The stepper motor driver 120 may present one or more signals (e.g., DRV). The stepper motor 127 moves the lens housing 128 in response to the signals DRV. The optical disc 123 has a number of disc tracks 126a-126n.

Figure 4:
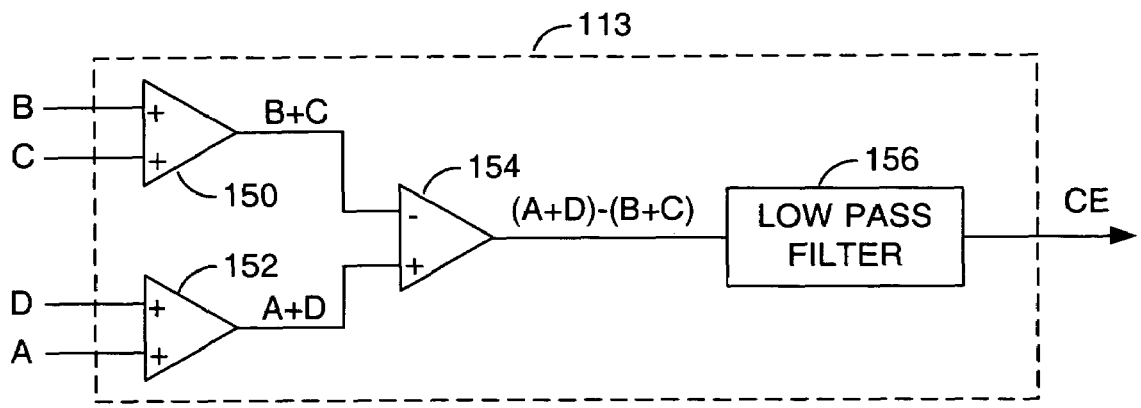
FIG. 4 is a diagram of the creation circuit of FIG. 3.

Referring to FIG. 4, a more detailed diagram of the CE creation block 113 is shown. The CE creation block 113 generally comprises a block (or circuit) 150, a block (or circuit) 152, a block (or circuit) 154 and a block (or circuit) 156. The circuit 150 and the circuit 152 may be implemented as summing circuits. The circuit 154 may be implemented as a differential circuit (e.g., a comparator, etc.). The circuit 156 may be implemented as a low pass filter. In general, the circuit 150 receives the signal B and the signal C and presents a signal equal to B+C. Similarly, the circuit 152 receives the signal A and the signal D and presents an output signal equal to A+D. The differential circuit 154 receives the signal B+C and the signal A+D and presents a signal equal to (A+D)−(B+C). The signal (A+D)−(B+C) is presented to the low pass filter 156, which generates the signal CE.

Figure 5:
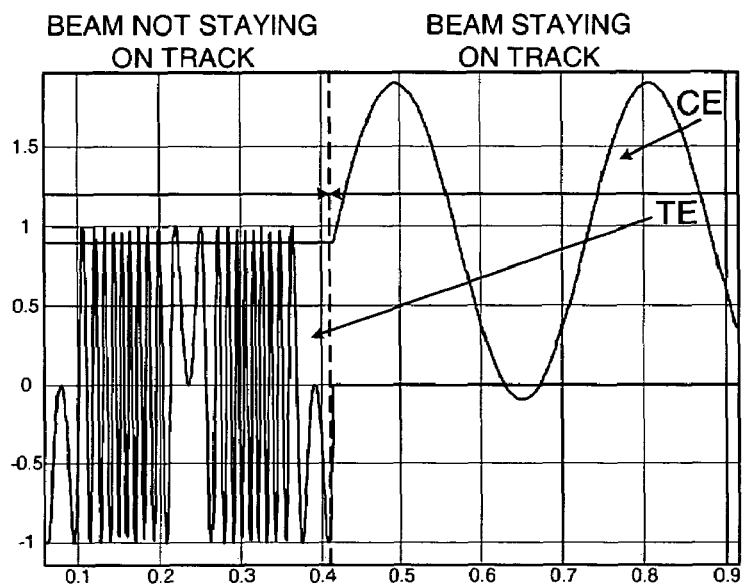
FIG. 5 is a diagram illustrating a tracking error signal and a center error signal.

Referring to FIG. 5, a diagram of a tracking error signal (e.g., TE) and the center error signal CE in accordance with a preferred embodiment of the present invention is shown. FIG. 5 illustrates the tracking error signal TE and the center error signal CE when a laser beam 122 is not staying on the same physical one of the tracks 126a-126n and when the laser beam 122 is staying on a particular one of the tracks 126a-126n as the disc 123 is rotating. A typical optical disc system 100 has a plurality of tracks 126a-126n that may be randomly accessed in response to input received from an end user. Without such inputs, a disc in a typical optical system 100 plays the tracks 126a-126n sequentially with the peak to peak amplitude of the center error signal CE depending on the reflectivity of the disc 123 and the disc eccentricity (sometimes called a disc run-out).

The tracking error signal TE is a signal created by either a differential phase detecting (DPD) method or a differential push pull (DPP) method. With the DPD method, the difference in phase of two signals (A+C) and (B+D) is used to create the signal TE. In the DPP method, the difference in value of two signals (A+D) and (B+C) is used to create the signal TE. Either method detects the position of the laser beam 122 in relation to the tracks 126a-126n on the disc 123. When the signal TE is properly generated, if the laser beam 122 is staying (or "locked") on a particular one of the physical tracks 126a-126n, then the signal TE may have a small change in value. If the laser beam 122 is moving across the tracks 126a-126n, then the signal TE will vary from peak to bottom. The center value of this variation will be the value of the signal TE when the beam is staying on a particular one of the tracks 126a-126n. A comparison of the signal TE and the signal CE (i) when the laser beam 122 is not staying on track and (ii) when the laser beam 122 is staying (or "locked") on track, is illustrated in FIG. 5.

Figure 6:
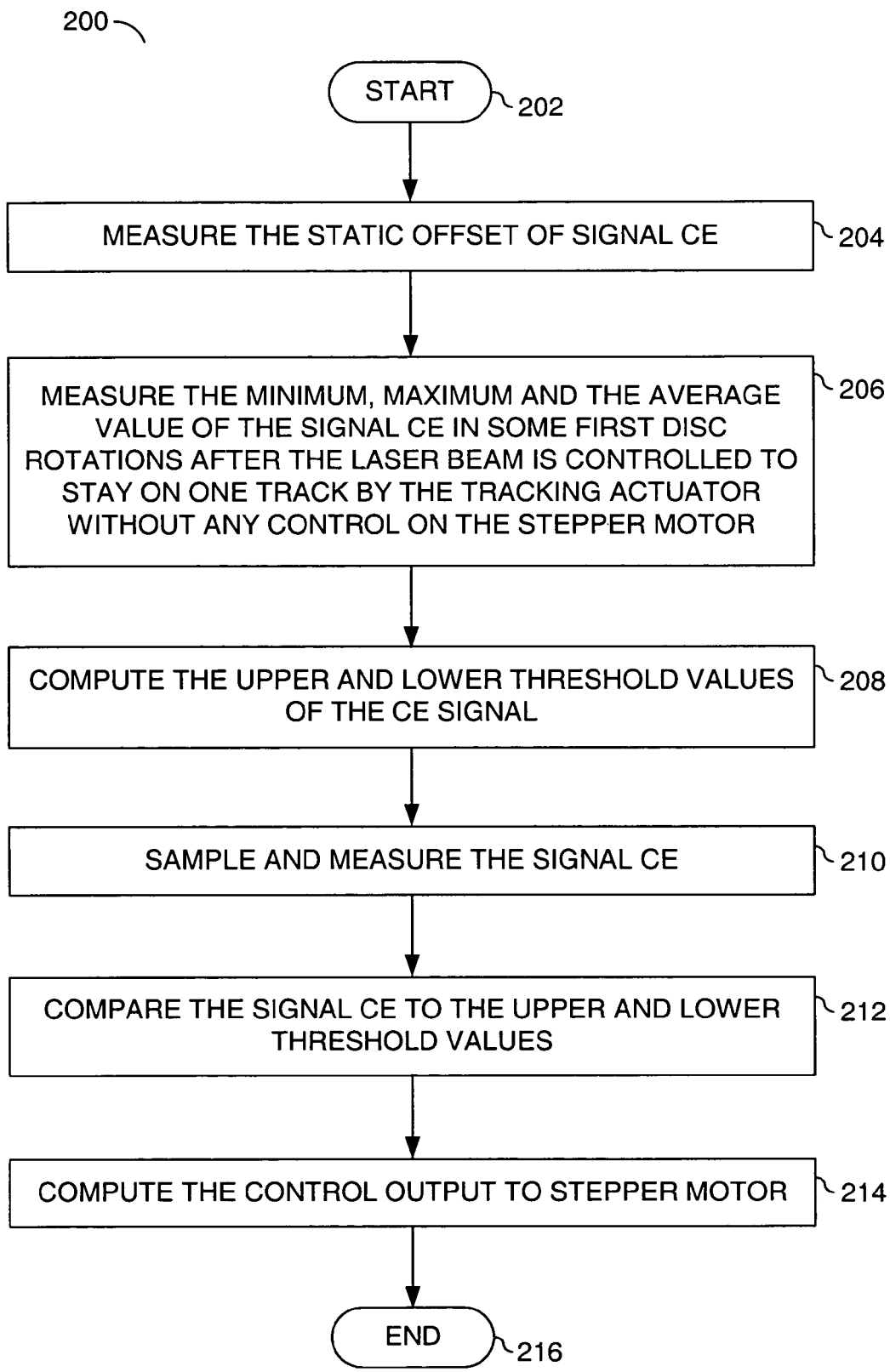
FIG. 6 is a flow diagram of a process of an embodiment of the present invention.

Referring to FIG. 6, a method 200 for controlling the stepper motor 127 in the optical disc system 100 is shown. The method 200 generally comprises a state (or step) 202, a state (or step) 204, a state (or step) 206, a state (or step) 208, a state (or step) 210, a state (or step) 212, a state (or step) 214 and a state (or step) 216. The state 202 generally comprises a start state. The state 204 generally comprises measuring the static offset level of the signal CE, which is the level of signal CE when the laser beam 22 is turned off. The state 206 generally comprises measuring the minimum, maximum and the average value of the signal CE. The measurement of the minimum, maximum and the average value of the signal CE is performed during the first few rotations of the disc 123 after the tracking actuator controls the laser beam 122 to stay on a particular one of the tracks 26a-26n without any control on the stepper motor 127. The state 208 generally comprises computing the upper threshold values and the lower threshold values of the signal CE. The step 210 generally comprises sampling and measuring the signal CE. The state 212 generally comprises comparing the signal CE to the upper threshold values and the lower threshold values to move the stepper motor 127. The state 214 computes the output to the stepper motor 127 based on the result of state 212. The state 214 generally comprises an end state.

The method 200 may be used to control the stepper motor 127. The method 200 generally applies when the tracking actuator moves the laser beam 122 across the disc tracks 126a-126n or when the tracking actuator keeps the laser beam 122 on a particular one of the tracks 126a-126n.

The state 204 is generally configured to measure the static offset level of the signal CE when the laser beam 122 is off. The static offset level (e.g., $L_o$) of the signal CE is normally measured in response to turning off the laser beam 122. The state 206 measures the maximum value (e.g., $L_{MAX}$) of the signal CE, the minimum value of the signal CE (e.g., $L_{MIN}$) and the average value of the signal CE (e.g., $L_{AVERAGE}$). The tracking actuator controls the laser beam 122 to stay on a particular one of the tracks 126a-126n without any control on the stepper motor 127 during the first few rotations (1st, 2nd, 3rd rotations) of the disc 123.

The state 208 computes one or more upper and lower threshold values of the signal CE. The state 210 samples and compares the signal CE with an appropriate frequency to obtain a sufficient sampling and comparison of the signal CE when the tracking actuator is controlling the laser beam 122 to stay on a particular one of the tracks 126a-126n or to move across the laser beam 122 across the tracks 126a-126n. When the tracking actuator is controlling the laser beam 122 to stay on a particular one of the tracks 126a-126n, the sampling and the frequency compared with the signal CE may be low. However, when the tracking actuator is controlling the laser beam 122 to move across the tracks 126a-126n, the sampling and frequency compared to the signal CE may be higher.

The state 212 compares the signal CE to the upper threshold values and the lower threshold values of the signal. The the state 212 selects the appropriate threshold values among one or more upper and lower threshold values depending on the control of the tracking actuator on the laser beam 122 to either control the beam 122 to stay on a particular track 126a-126n or to move the beam 122 across the tracks 126a-126n. The state 214 computes the output control to the stepper motor 127 based on the result of the comparison in the state 212 and the polarity of the signal CE.

Figure 7:
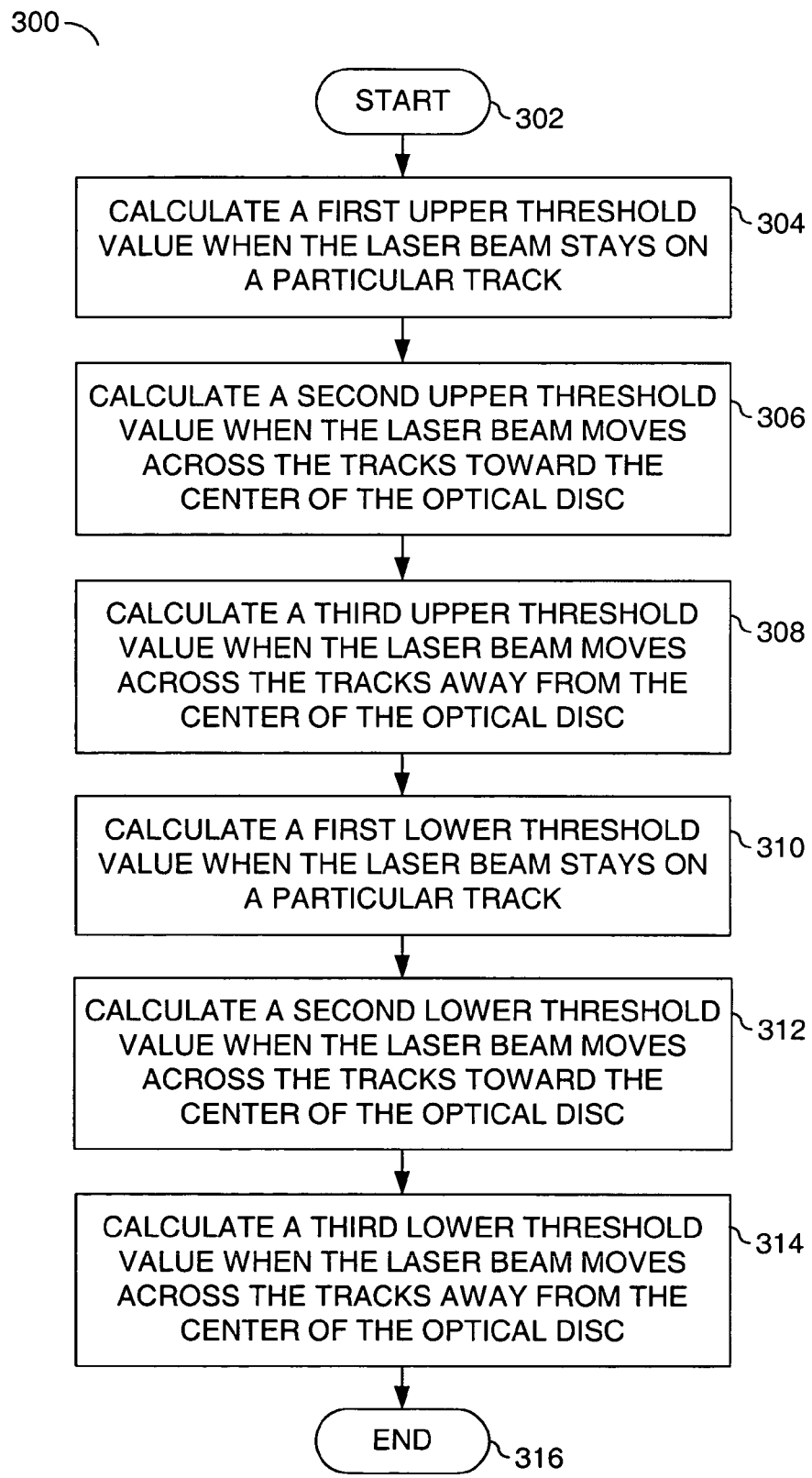
FIG. 7 is a flow diagram for computing the upper and lower thresholds of the signal CE.

Referring to FIG. 7, a method for computing the upper and lower thresholds of the signal CE is shown. The method 300 generally comprises a state (or step) 302, a state (or step) 304, a state (or step) 306, a state (or step) 308, a state (or step) 310, a state (or step) 312, a state (or step) 314 and a state (or step) 316. The state 302 generally comprises a start state.

The method 300 computes one or more upper threshold values of the signal CE as follows:

The state 304 generally comprises calculating a first upper threshold value of the signal CE when the tracking actuator is controlling the laser beam 122 to stay on a particular one of the tracks 126a-126n (e.g., $L_{upper1}$).

$$L_{upper1}=L_o+K_{upper1}*(L_{MAX}-L_{AVERAGE})$$

The state 306 generally comprises calculating a second upper threshold value of the signal CE when the tracking actuator is controlling the laser beam 122 to move across the tracks 126a-126n toward the center of the optical disc 123 (e.g., $L_{upper2}$).

$$L_{upper2}=L_o+K_{upper2}*(L_{MAX}-L_{AVERAGE})$$

The state 308 generally comprises calculating a third upper threshold value of the signal CE when the tracking actuator is controlling the laser beam 122 to move across the tracks 126a-126n away from the center of the optical disc 123 (e.g., $L_{upper3}$).

$$L_{upper3}=L_o+K_{upper3}*(L_{MAX}-L_{AVERAGE})$$

The state 310 generally comprises calculating a first lower threshold value of the signal CE when the tracking actuator is controlling the laser beam 122 to stay on a particular one of the tracks 126a-126n (e.g., $L_{lower1}$).

$$L_{lower1}=L_o+K_{lower1}*(L_{MAX}-L_{AVERAGE})$$

The state 312 generally comprises calculating a second lower threshold value of the CE signal when the tracking actuator is controlling the laser beam 122 to move across the tracks 126a-126n toward the center of the optical disc 123 (e.g., $L_{lower2}$)

$$L_{lower2}=L_o+K_{lower2}*(L_{MAX}-L_{AVERAGE})$$

The state 314 generally comprises calculating a third lower threshold value of the CE signal when the tracking actuator is controlling the laser beam 122 to move across the tracks 126a-126n away from the center of the optical disc 123 (e.g., $L_{lower3}$)

$$L_{lower3}=L_o+K_{lower3}*(L_{MAX}-L_{AVERAGE})$$

Where $K_{upper1}$, $K_{upper2}$, $K_{upper3}$ and $K_{lower1}$, $K_{lower2}$, $K_{lower3}$ are predefined coefficients and chosen appropriately depending on the polarity of the signal CE and the length of one micro-step of the stepper motor 127. In general, the micro-step is the minimal distance the stepper motor driver 120 can control the stepper motor 127 to move. The polarity of the signal CE is defined by the change in average value of signal CE when the lens 124 is moving toward the outer part of the optical disc 123 (or away from the center of the optical disc 123) while the laser beam 122 is focusing on the disc surface.

Figure 8:
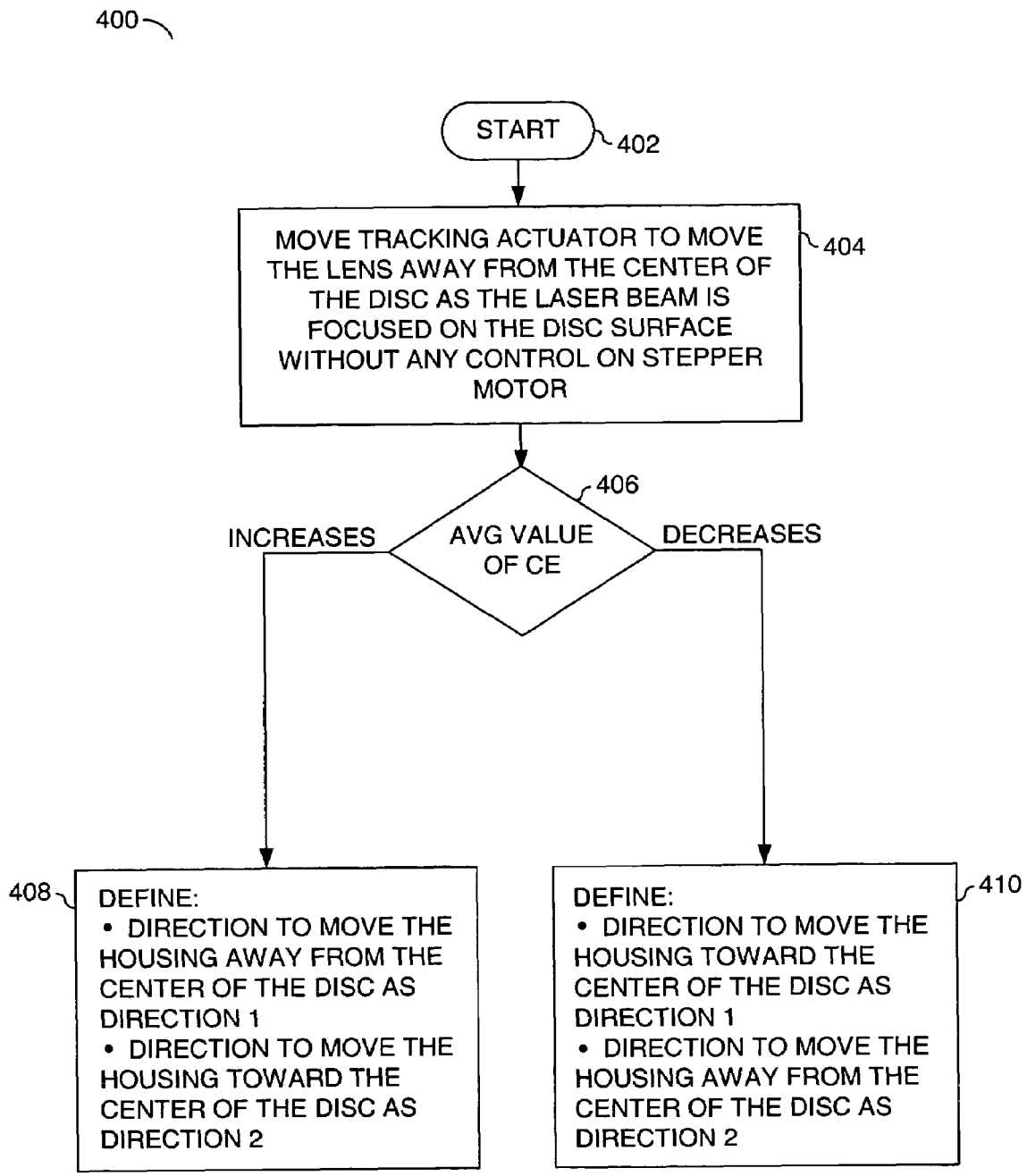
FIG. 8. is a flow diagram for defining the polarity of the signal CE the direction of control output of the stepper motor.

Referring to FIG. 8, a method for defining the polarity of the signal CE and the direction of control output of the stepper motor 127 is shown. The method 400 generally comprises a state (or step) 402, a state (or step) 404, a decision state 406, a state (or step) 408, and a state (or step) 410. The state 402 generally comprises a start state. The state 404 generally comprises using the tracking actuator to move the lens 124 away from the center of the disc 123 without any control on the stepper motor 127 when the laser beam 122 is focused on the surface of the disc 123.

The decision state 406 generally comprises measuring an average value of the signal CE in response to moving the lens 124 away from the center of the disc 123. In the decision state 406, if the average value of the signal CE is increased after using the tracking actuator to move the lens 124 away from the center of the disc 123, the method 400 moves to the state 408. The state 408 generally comprises defining directions in which to move the housing 128 with the stepper motor 127. A first direction (e.g., Direction 1) is defined as the direction in which the stepper motor 127 moves the housing 128 away from the center of the disc 123. A second direction (e.g., Direction 2) is defined as the direction in which the stepper motor 127 moves the housing 128 toward the center of the disc 123.

In the decision state 406, if the average value of the signal CE is decreased after using the tracking actuator to move the lens 124 away from the center of the disc 123, the method 400 moves to the state 410. The state 410 generally comprises defining the direction in which to move the housing 128 with the stepper motor 127. A first direction (e.g., Direction 1) is defined as the direction in which the stepper motor 127 moves the housing 128 toward the center of the disc 123. A second direction (e.g., Direction 2) is defined as the direction in which the stepper motor 127 moves the housing 128 away from the center of the disc 123.

Figure 9:
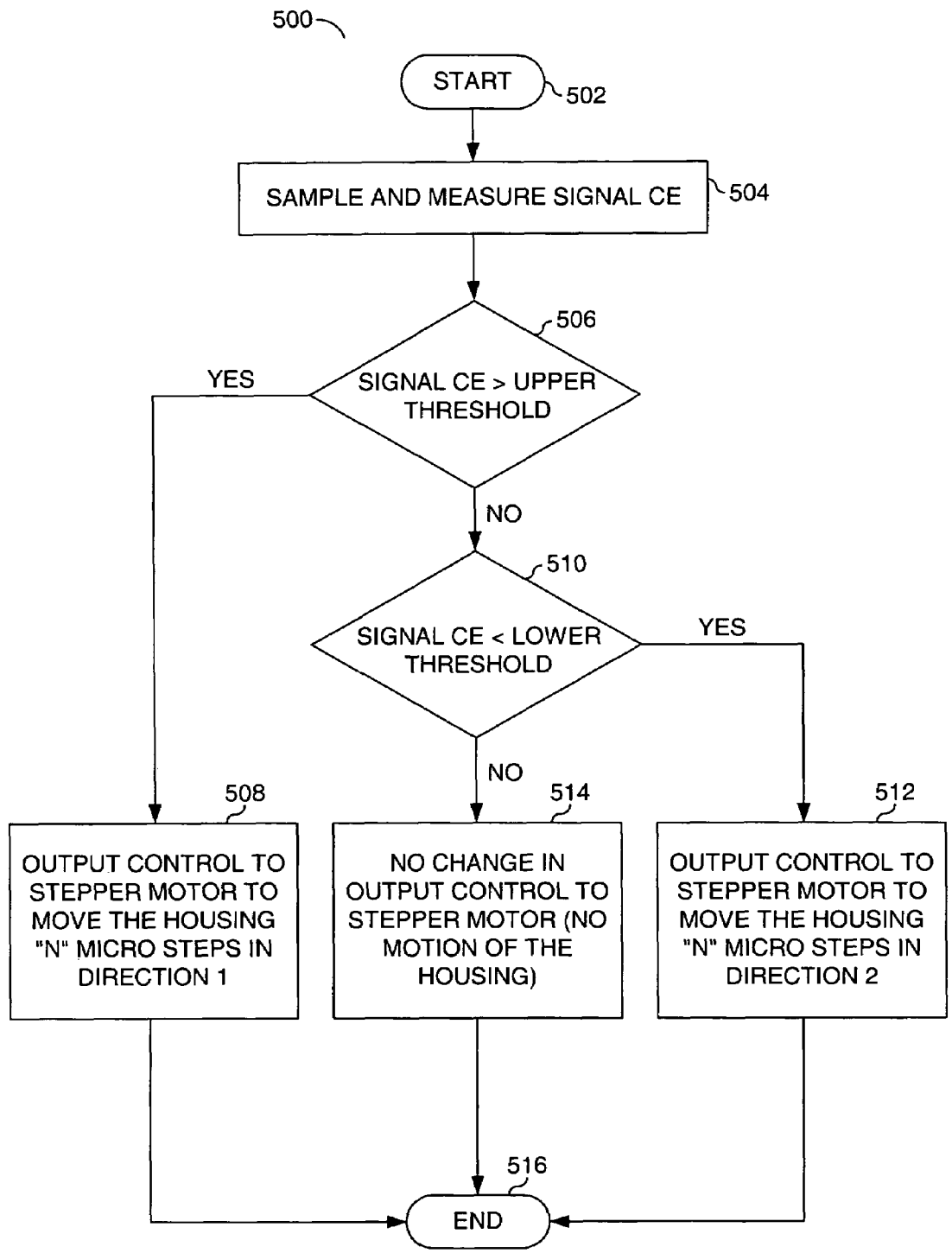
FIG. 9 is a flow diagram for computing the control output of the stepper motor.

Referring to FIG. 9, a method for computing the control output of the stepper motor 127 is shown. The method 500 generally comprises a state (or step) 502, a state (or step) 504, a decision state 506, a state (or step) 508, a decision state 510, a state (or step) 512, a state (or step) 514, and a state (or step) 516. The state 502 generally comprises a start state.

The state 504 generally comprises sampling and measuring the signal CE at an appropriate frequency. The signal CE is sampled and measured when the tracking actuator is controlling (i) the laser beam 122 to stay on a particular one of the track 126a-126n or (ii) moving the laser beam 122 across the tracks 126a-126n either away from the center of the disc 123 or toward the center of the disc 123. The frequency may be lower if the laser beam 122 is staying a particular one of the tracks 126a-126n. The frequency may be higher if the laser beam 122 moves across the tracks 126a-126n either away from the center of the disc 123 or toward the center of the disc 123.

In the decision state 506, if the signal CE is greater than the upper threshold value, the method 500 moves to state 508. In the state 508, the output control to the stepper motor 127 may move the housing in the first direction (e.g. Direction 1) N micro-steps away from the from the center of the disc 123. The variable N is a predefined number depending on the length of one micro-step, normally chosen as 1.

In the decision state 506, if the signal CE is less than the upper threshold value, the method 500 moves to the decision state 510. In the decision state 510, if the signal CE is less than the lower threshold value, the method moves to the state 512. In the state 512, the output control to the stepper motor 127 may move the housing 128 in the second direction (e.g. Direction 2) N micro-steps toward the center of the disc 123. The variable N is a predefined number depending on the length of one micro-step, normally chosen as 1.

In the decision state 510, if the signal CE is greater than or equal to the lower threshold value, the method moves to the state 514. In the state 514, there is no change in output control to the stepper motor 127 (e.g., no motion of the housing). The selection of the upper threshold values and the lower threshold values in the method 500 may depend on the control of tracking actuator on the laser beam 122. If the tracking actuator is controlling the laser beam 122 to stay on a particular one of the tracks 126a-126n, then the upper and lower threshold values are selected as $L_{upper1}$ and $L_{lower1}$. If the tracking actuator is controlling the laser beam 122 to move across the tracks 126a-126n towards the center of the disc 123, then the upper and lower threshold values are selected as $L_{upper2}$ and $L_{lower2}$. If the tracking actuator is controlling the laser beam 122 to move across the tracks 126a-126n away from the center of the disc 123, then the upper and lower threshold values are selected as $L_{upper3}$ and $L_{lower3}$.

The present invention may (i) effectively control the lens 124 position inside the housing 128 when the laser beam 122 is positioned on a particular one of the tracks 126a-126n or when the laser beam 122 is moved across the tracks 126a-126n, (ii) improve the laser beam 122 balance when the laser beam 122 stays on a particular one of the tracks 126a-126n, and (iii) provide robust performance to the change in laser reflectivity when changing one or more discs 123 because the upper and the lower threshold values are dynamically calculated and recalculated when media is changed.

The present invention may provide advantages over conventional solutions. The present invention may provide an ultimate solution that may be applicable to next generations of optical drives. The present invention may allow for simple implementation. The present invention may provide a solution that is sensitive and reliable with high resolution and low cost.

The function performed by the flow diagram of FIG. 6 may be implemented in hardware, software (firmware) or a combination of hardware and software. The present invention may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

The present invention may be applied for all kind of CD optical discs (e.g., CD-ROM, CD-R, CD-RW, etc.) as well as DVD-ROM, DVD-R, DVD-RW, DVD+R, DVD+RW. The present invention may also be applicable to next generation optical discs (e.g., Blue-Ray discs and HD-DVD).

While the invention has been particularly shown and described with reference to the preferred embodiments thereof, it will be understood by those skilled in the art that various changes in form and details may be made without departing from the spirit and scope of the invention.

The invention claimed is:

1. A method for controlling a stepper motor in an optical disc system, comprising the steps of:
   (A) measuring a static offset level of a center error signal with a laser beam of said optical disc system turned off;
   (B) measuring a maximum value, minimum value and an average value of said center error signal in response to rotating an optical disc while both (i) said laser beam is turned on and controlled to say on a particular track of said optical disc and (ii) no control is applied to said stepper motor;
   (C) computing upper threshold values and lower threshold values based upon said static offset level, said maximum value, said minimum value and said average value of the center error signal by (i) calculating a first upper threshold value and a first lower threshold value when said laser beam stays on said particular track of said optical disc, (ii) calculating a second upper threshold value and a second lower threshold value when said laser beam moves across one or more tracks towards a center of said optical disc, and (iii) calculating a third upper threshold value and a third lower threshold value when said laser beam moves across one or more tracks away from said center of said optical disc;
   (D) selecting one of the upper threshold values and a corresponding one of the lower threshold values computed in step (C) based upon a direction of movement of said laser beam;
   (E) sampling said center error signal;
   (F) comparing a sample of said center error signal to the selected upper and lower threshold values; and
   (G) computing a control output to control said stepper motor in response to a result of comparing said sample of said center error signal to the selected upper and lower threshold values.

2. The method according to claim 1, wherein step (B) further comprises the steps:
   moving a lens within a housing coupled to said stepper motor away from the center of the optical disc without any control on said stepper motor when measuring said average value of said center error signal;
   if the average value of said center error signal measured increases as said lens moves within said housing, defining a first direction to move said housing as a direction in which said housing moves away from the center of said optical and defining a second direction to move said housing as a direction in which said housing moves toward said center of said optical disc; and
   if the average value of said center error signal measured decreases as said lens moves within said housing, defining the first direction to move said housing as the direction in which said housing moves toward said center of said optical disc and the second direction to move said housing as the direction in which said housing moves away from said center of said optical disc.

3. The method according to claim 2, wherein:
   said control output to control said stepper motor is generated to maintain a position of said housing when said sample of said center error signal is less than or equal to the selected upper threshold value and greater than or equal to the selected lower threshold value;
   said control output to control said stepper motor is generated to move said housing a predetermined number of microsteps in the first direction when said sample of said center error signal is greater than the selected upper threshold value; and
   said control output to control said stepper motor is generated to move said housing a predetermined number of microsteps in the second direction when said sample of said center error signal is less than the selected lower threshold value.

4. The method according to claim 1, wherein step (E) comprises:
   sampling said center error signal at an appropriate frequency when a tracking actuator controls said laser beam to (i) stay on a track of said optical disc or (ii) move across one or more tracks of said optical disc.

5. The method according to claim 4, wherein:
   said center error signal is sampled at a first frequency when said tracking actuator controls said laser beam to stay on said track of said optical disc and a second frequency when said tracking actuator controls said laser beam to move across said one or more tracks of said optical disc, said second frequency being higher than said first frequency.

6. The method according to claim 1, further comprising the steps of:
comparing said first upper threshold value to said center error signal when said laser beam stays on a track of said optical disc;
comparing said second upper threshold value to said center error signal when said laser beam moves across one or more tracks towards said center of said optical disc; and
comparing said third upper threshold value to said center error signal when said laser beam moves across one or more tracks away from said center of said optical disc.

7. The method according to claim 6, further comprising the step of:
moving a lens housing in a direction away from said center of said optical disc a distance of a predefined number of microsteps if said center error signal is greater than said first upper threshold value, said second upper threshold value or said third upper threshold value.

8. The method according to claim 1, further comprising the steps of:
comparing said first lower threshold value to said center error signal when said laser beam stays on a track of said optical disc;
comparing said second lower threshold value to said center error signal when said laser beam moves across one or more tracks towards said center of said optical disc; and
comparing said third lower threshold value to said center error signal when said laser beam moves across one or more tracks away from said center of said optical disc.

9. The method according to claim 8, further comprising the step of:
moving a lens housing in a direction toward said center of said optical disc a distance of a predefined number of microsteps if said center error signal is less than said first lower threshold value, said second lower threshold value, or said third lower threshold value.

10. The method according to claim 1, wherein:
said optical disc is rotated one or more rotations during measurement of said maximum value, said minimum value and said average value of the center error signal.

11. A computer readable medium containing instructions executable by a computer, said instructions configured to cause said computer to execute the steps of claim 1.

12. The method according to claim 1, further comprising the step of determining a polarity of said center error signal, wherein computing said control output to control said stepper motor takes into account said polarity of said center error signal.

13. The method according to claim 1, wherein:
said control output controls said stepper motor to move a lens housing (i) in a first direction away from said center of said optical disc a distance of a predefined number of microsteps when said sample of said center error signal is greater than said first upper threshold value, said second upper threshold value or said third upper threshold value and (ii) in a second direction toward said center of said optical disc a distance of a predefined number of microsteps when said center error signal is less than said first lower threshold value, said second lower threshold value, or said third lower threshold value.

14. The method according to claim 1, further comprising generating said center error signal and a tracking error signal in response to a plurality of photo-diode signals, wherein the tracking error signal has minimal change in value when said laser beam is staying on a track of the optical disc.

15. An apparatus for controlling a stepper motor in an optical disc system comprising:
means for measuring a static offset level of a center error signal with a laser beam of said optical disc system turned off;
means for measuring a maximum value, a minimum value and an average value of said center error signal in response to rotating an optical disc while both (i) said laser beam is turned on and controlled to stay on a particular track of said optical disc and (ii) no control is applied to said stepper motor;
means for computing upper threshold values and lower threshold values based upon said static offset level, said maximum value, said minimum value and said average value of said center error signal by (i) calculating a first upper threshold value and a first lower threshold value when said laser beam stays on said particular track of said optical disc, (ii) calculating a second upper threshold value and a second lower threshold value when said laser beam moves across one or more tracks towards a center of said optical disc, and (iii) calculating a third upper threshold value and a third lower threshold value when said laser beam moves across one or more tracks away from said center of said optical disc;
means for selecting one of the upper threshold values and a corresponding one of the lower threshold values computed by the computing means based upon a direction of movement of said laser beam;
means for sampling said center error signal;
means for comparing a sample of said center error signal to the selected upper and lower threshold values; and
means for computing a control output to control said stepper motor in response to a result of comparing said sample of said center error signal to the selected upper and lower threshold values.

16. A method for controlling a stepper motor in an optical disc system, comprising the steps of:
(A) measuring a static offset level of a center error signal with a laser beam of said optical disc system turned off;
(B) measuring a maximum value, a minimum value and an average value of said center error signal in response to rotating an optical disc while both (i) said laser beam is turned on and controlled to stay on a particular track of said optical disc and (ii) no control is applied to said stepper motor;
(C) computing a plurality of upper threshold values and lower threshold values based upon said static offset level, said maximum value, said minimum value and said average value of said center error signal;
(D) computing a control output to control said stepper motor in response to comparing said center error signal to (i) a first upper threshold value from said plurality of upper threshold values computed in step (C) when said laser beam stays on a track of said optical disc, (ii) a second upper threshold value from said plurality of upper threshold values computed in step (C) when said laser beam moves across one or more tracks towards a center of said optical disc and (iii) a third upper threshold value from said plurality of upper threshold values computed in step (C) when said laser beam moves across one or more tracks away from said center of said optical disc.

17. A method for controlling a stepper motor in an optical disc system, comprising the steps of:
(A) measuring a static offset level of a center error signal with a laser beam of said optical disc system turned off;

(B) measuring a maximum value, a minimum value and an average value of said center error signal in response to rotating an optical disc while both (i) said laser beam is turned on and controlled to stay on a particular track of said optical disc and (ii) no control is applied to said stepper motor;

(C) computing a plurality of upper threshold values and a plurality of lower threshold values based upon said static offset level, said maximum value, said minimum value and said average value of said center error signal;

(D) computing a control output to control said stepper motor in response to comparing said center error signal to (i) a first lower threshold value from said plurality of lower threshold values computed in step (C) when said laser beam stays on a track of said optical disc, (ii) a second lower threshold value from said plurality of lower threshold values computed in step (C) when said laser beam moves across one or more tracks towards a center of said optical disc and (iii) a third lower threshold value from said plurality of lower threshold values computed in step (C) when said laser beam moves across one or more tracks away from said center of said optical disc.

* * * * *